United States Patent [19]

Lilliston, Sr. et al.

[11] E Patent Number: Re. 33,638

[45] Reissued Date of Patent: Jul. 16, 1991

[54] MOBILE FAN FOR POULTRY FARMING

[76] Inventors: William E. Lilliston, Sr.; William E. Lilliston, Jr., both of 1311A Middle Neck Dr., Salisbury, Md. 21801

[21] Appl. No.: 382,739

[22] Filed: Jul. 19, 1989

Related U.S. Patent Documents

Reissue of:

[64] Patent No.: 4,681,064
Issued: Jul. 21, 1987
Appl. No.: 769,118
Filed: Aug. 26, 1985

[51] Int. Cl.[5] ..... A01K 31/18
[52] U.S. Cl. ..... 119/21; 98/39.1
[58] Field of Search ..... 98/33.1, 39.1, 94.1, 98/1; 119/19, 21, 22, 82

[56] References Cited

U.S. PATENT DOCUMENTS

| | | | |
|---|---|---|---|
| Re. 28,708 | 2/1976 | Reynolds | 119/82 |
| 1,324,713 | 12/1919 | Adsit | 98/94.1 |
| 1,874,573 | 8/1932 | Moore . | |
| 2,078,580 | 4/1937 | Moore | 98/1 |
| 2,165,650 | 7/1939 | Pfautsch | 98/94.1 |
| 2,257,734 | 10/1941 | Cornell | 119/21 |
| 2,273,502 | 2/1942 | Couse | 98/1 |
| 2,300,418 | 11/1942 | Hall . | |
| 2,335,173 | 11/1943 | Corey | 119/21 |
| 2,786,627 | 3/1967 | Hopper | 98/94.1 |
| 3,110,286 | 11/1963 | Clute | 119/22 |
| 3,306,533 | 2/1967 | Vertrees et al. . | |
| 3,557,756 | 1/1971 | Ramsey | 119/19 X |
| 3,892,201 | 7/1975 | Crawford | 119/17 |
| 4,151,811 | 5/1979 | Truhan | 119/21 |
| 4,173,947 | 11/1979 | Whiteside, Jr. | 119/18 |
| 4,205,627 | 6/1980 | Buchanan | 119/19 |
| 4,412,478 | 11/1983 | Osher et al. | 98/39.1 |

FOREIGN PATENT DOCUMENTS

| | | | |
|---|---|---|---|
| 1403554 | 6/1969 | Fed. Rep. of Germany . | |
| 2121296 | 11/1972 | Fed. Rep. of Germany | 119/21 |
| 678494 | 3/1930 | France . | |
| 571225 | 9/1977 | U.S.S.R. | 119/21 |

*Primary Examiner*—Harold Joyce
*Attorney, Agent, or Firm*—Nolte, Nolte and Hunter

[57] ABSTRACT

A mobile blower or fan is used to cool and dry poultry houses. The fan includes a propeller which is driven by a gasoline/fuel engine and the engine is mounted on a wooden base and covered by an encompassing cage. By means of feet attached on the underside of the cage floor, it is possible to move the fan or blower around to places where it is needed.

10 Claims, 3 Drawing Sheets

MOBILE FAN FOR POULTRY FARMING

Matter enclosed in heavy brackets [ ] appears in the original patent but forms no part of this reissue specification; matter printed in italics indicates the additions made by reissue.

FIELD OF THE INVENTION

This invention relates to the poultry industry, and more particularly to means and a method for improving the production of boilers; that is, edible poultry, preferably on a large scale. The term "poultry" as used herein, means and is intended to mean, domestic fowls which are propagated and fattened for the table and for their eggs, feathers, etc., such as chickens, turkeys, ducks, guinea fowls and geese.

DESCRIPTION OF THE PRIOR ART

Conventionally, broiler poultry are grown or reared on the floors of insulated barns or the like, with a litter of straw, shavings, shells, or other discrete particles or frangible material. The dropping or manure from the birds are allowed to accumulate and to penetrate or permeate the previously disposed litter of straw, shells, shavings or other particle-like material. Periodically, this accumulation is cleaned out manually, washed out or otherwise disposed of and removed from the chicken house. Then a new or fresh batch of such litter is laid down on the clean floor. This method of raising poultry on an industrial scale has its disadvantages as, for example, by reason of the cost of buying, spreading and removing the litter with the accumulated droppings from the floor of the chicken house or barn.

Alternatively, it has been proposed to raise poultry birds on wire screening, and to dispose of the manure droppings by moving conveyor belts that are positioned below the wire floors upon which the birds are placed during the growing period.

It has also been proposed, as in U.S. Pat. No. 3,892,201, to house the birds in cage units which have solid floors; with a series of such solid floors being disposed in a vertically spaced relationship, with the poultry being raised on some or all of the floors. In this method, the droppings produced by the growing poultry are not periodically removed, but are permitted to pile up or build up on the floor surfaces of the bird cages. This forms a litter-free layer of manure upon which the poultry are supported during the growing period. Throughout that period the manure is dried out and maintained in a dry state by passing a current or flow of air over the floor surfaces and the layer of manure covering the floor and interposed between that floor and the poultry.

To that end, air under pressure is expelled from an air chamber provided with vertically spaced and aligned outlets for each level or tier of tiered bird cages. Each of the air outlets is equipped with a deflector in order to spread the flow of air evenly over the floor surfaces, and to dry out the piled up manure covering the floor surfaces on each of the stacked floors or tiers. By such means, the moisture level of manure layer is maintained substantially below about 40% by weight of such manure.

SUMMARY OF THE INVENTION

The present inventive improvements relate to a mobile fan used to cool and dry the poultry houses or the like. Such fan comprises a propeller driven by a gasoline fuel engine which may be mounted on a wooden base. The fan assembly may be covered by an encompassing cage and it may be moved around place to place at needed or found to be desirable.

In contrast to the conventional practices as exemplified in U.S. Pat. No. 4,173,947 where fan or blowers are permanently mounted in animal husbandry buildings, the present invention provides a relatively large self-contained and totally mobile fan. Its applications include the following advantages:

1. Cooling broiler and turkey houses during the critical periods just before "catch-out". This is particularly valuable during the hot summer months when mortalities of the birds climb and feed conversion plummets. The term "catch-out" refers to the process wherein the grown poultry ready to be marketed are manually caught by the legs and caged for subsequent transport to the slaughter house, where they are individually strung up on a line, stunned and killed by knife.

2. Ventilating poultry houses during "catch-out" process. Workers in these places are provided with safer, more pleasant environment and respiratory and heat related problems with catching crews are minimized.

3. Cooling birds during transport and while holding for processing, "DOA's" drop substantially and the birds are in a more relaxed comfortable state for "hanging on the line".

4. Odors, ammonia fumes, dust and other pollutants or undesirable materials occasioned by spills around the processing plants can be minimized by the present invention which not only dilutes the hazardous ammonia fumes, but dries up the offending materials and minimizes odors therefrom.

5. Replacement parts for both the fan and the engine are readily available as may be needed during operation of the present fan assembly.

As indicated above, hazardous fumes in or about poultry houses or other animal barns threaten not only the health and well being of the poultry and animals, but also that of the workers whose job it is to care for them. Furthermore, the quality of the eggs, poultry and pork produced by the chickens, turkeys and pigs is adversely affected. Such barnyard creatures are increasingly confined to close quarters or indoors, and the air therein is badly polluted by four known gases; namely, ammonia, methane, hydrogen sulphide and carbon dioxide. These gases are produced by the animals, and their manure, and they are known to cause respiratory ailments in humans as well as animals and poultry. In particular, it has been found that ammonia fumes can affect the quality of eggs in chicken houses; and that turkeys suffer lung damage even from low levels of ammonia in or about the turkey farm structures. Federal and state regulators, the poultry industry, and the unions are becoming increasingly concerned about the well-documented respiratory and skin difficulties faced by poultry catchout crews. The present invention proposes to deal with these problems.

BRIEF DESCRIPTION OF THE DRAWINGS

With the above and other objects in view, as will be apparent, the invention consists of the construction, combination and arrangement of parts all in hereinafter more fully described, claimed and illustrated in the accompanying drawings, wherein:

DETAILED DESCRIPTION OF THE INVENTION

Figure 1:
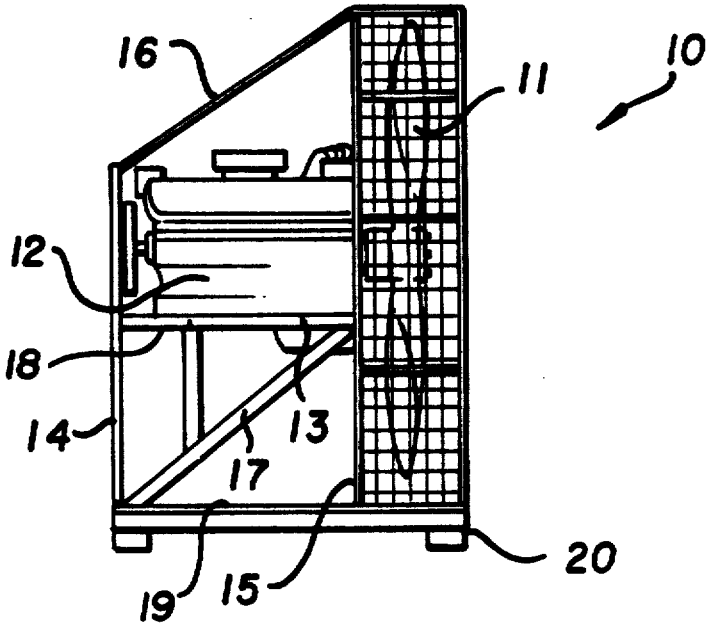
FIG. 1 is a side view of the inventive fan/engine-cage assembly.

In a preferred embodiment of the present invention, as seen in FIG. 1, such may comprise a mobile blower assembly 10 including a relatively large propeller 11 which may be a wooden aircraft-type propeller with diameter and pitch of 72 inches by 48 inches, and a bolt plate of aluminum, six bolts, 4.5 inches in diameter. Propellers of that type presently are manufactured and sold by Sensenich, Inc.

The propeller member 11 is mounted for rotation on the drive shaft of *an internal combustion engine, in the drawings, shown as* a gasoline powered engine 12 provided with conventional built-in fuel and cooling systems. The specifications of an engine 12 found to be satisfactory in performance are set forth in the following table:

| Engine Specifications | |
|---|---|
| Type | GM V-8, iron block and heads |
| Displacement | 472 cu. in. 7776 cc |
| | 500 cu. in. 8237 cc |
| Bore × stroke | |
| (472) | 4.3 × 4.06 in. 109.1 × 103.0 cc |
| (500) | 4.3 × 4.30 in. 109.1 × 109.2 cc |
| Power (SAE net) | 375b bhp @ 4400 rpm |
| | 400 bhp @ 4400 rpm |
| Torque (SAE net) | 525 lbs.-ft. @ 3000 rpm |
| | 550 lbs.-ft. @ 3000 rpm |
| Compression ratio | 8.5:1 |
| Valve gear | pushrod, hydraulic lifters |
| Fuel system | GMV-4 750 cfm, electric pump |
| Speed control | cable throttle |
| Spark plug/gap | Champion RN 12YC/.030 in. |
| Dwell angle | 30° |
| Firing order | 4-5-6-3-4-2-7-8 |
| Ignition timing | 10° BTDC |
| Valve angle (seat/face) | 45°/44° |
| Electrical component | 60 amp alternator |
| Battery | 12-volt 560 amp |

As will be understood, the engine 12 15 also preferably equipped with standard equipment (not shown) such as:

| Standard Equipment |
|---|
| Electric Fuel Pump |
| Fuel Filter/Water Separator |
| Throttle Cable |
| Automatic Shutdown Module |
| Ammeter |
| Tachometer |
| 3 Point Key Switch |
| Fuel Tank with Gauge |
| Heavy-Duty Battery |
| Cooling System Overflow Tank |
| Lube Oil Filter (Spin-on) |
| High Torque Cam |
| Heavy-Duty Pistons and Rods |
| Air Intake Filter |

Figure 4:
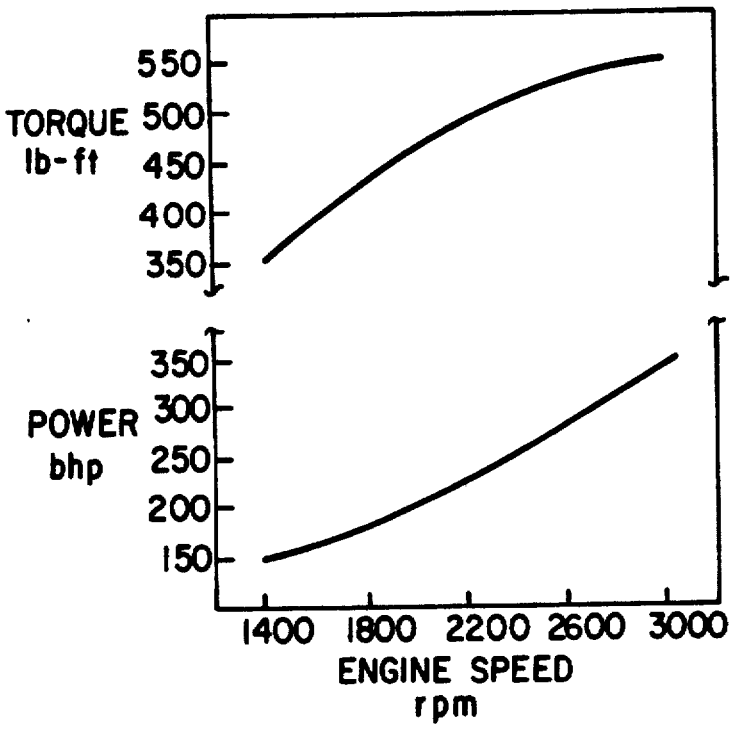
FIG. 4 is illustrative of the preformance curve figures for a standard engine, without the fan attached to the engine drive shaft.

The performance curves in terms of the relative torque, power and speed of the engine 12 (without the propeller or fan attached) are noted in FIG. 4. The data there shown are approximate average figures for operation of the engine 12 minus the fan or blower unit 11.

The performance data of the engine 12 was found to be as follows:

| Engine Performance Data | |
|---|---|
| Average Operating Speed | 1500 rpm |
| Sidewall Air Speed | 2-3 mph |
| Center House Air Speed | 5-16 mph |
| Average Air Speed | 4 mph |
| Total Air Exchange Time | 1.25 minutes |
| Total Air Movement | 118,000 cfm |

The above figures reflect operations of the engine in a 400 foot section chicken house. The present mobile fan assembly was placed across one end door of the chicken house, sidewall curtains were closed in the first two chambers opposite the end doors remained opened and in the third section, the curtains were partially opened.

Figure 2:
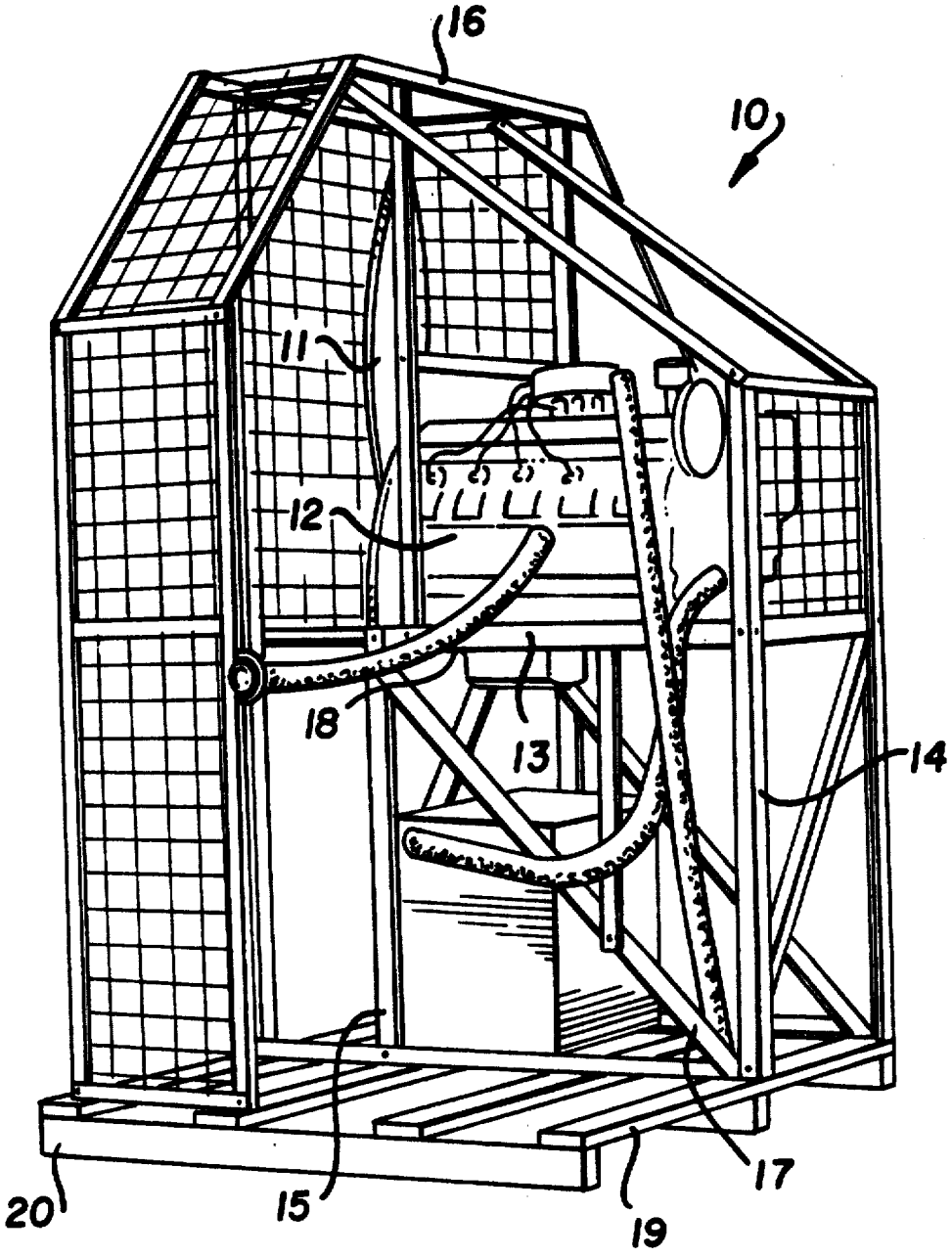
FIG. 2 is a perspective view of the same as seen from the other side of the apparatus.
Figure 3:
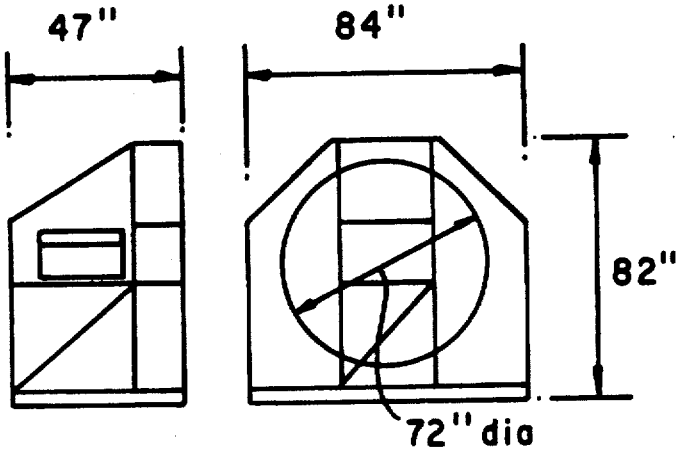
FIG. 3 is a schematic representation of the dimensions of a preferred mobile blower apparatus.

Referring to FIGS. 1 and 2, the engine 12, with propeller 11 attached thereto and in position for rotation are fixedly secured to a horizontally extending platform 13 which is attached to vertical uprights 14 and 15 at the front and rear of the encompassing or enclosing wire screen or chain link cage 16. Additional support for the engine mounting platform 13 may be provided by the obliquely disposed strut 17 extending from the underside 18 of the platform 13 to the relatively thick wooden flooring 19 of the cage 16.

The frame of the cage 16 may be made of aluminum angle 60-61 T6, fastened together in the shape illustrated in FIGS. 1 and 2 of the drawings with aircraft-type locknuts and bolts. As indicated above, the base 19 of cage 16 preferably and economically is made of wood.

Metal, or other suitable material, feet 20 are fastened as by welding to the four corners of the underside of the floor 19 of cage 16: thereby rendering it portable or mobile. That is to say, the extending fork (not shown) of a conventional forklift truck may be moved into the space or gap located between the underside of the floor 19 and the ground upon which the feet 20 rest. The whole blower assembly 10 of the present invention may then be bodily lifted off the ground by the forklift truck and moved to any chicken house or other animal brooding station as may be required or desired.

Alternatively, the metal feet 20 may be replaced by casters of a suitable size and strength at the four corners of the cage 16 and the entire assembly 10 moved from place to place as desired by means other than the forklift.

The overall weight of the mobile blower assembly according to a preferred embodiment of the present invention may be in the order of 1050 lbs; its center of gravity 40 inches; its cooling system capacity 21.8 qts.; the oil system capacity 5 qts.; and the fuel capacity 27 gallons.

In operation, the combination engine/fan systems of the present invention have been found effective to the extent of providing air movement in the order of 118,000 CFM with a 4 MPH Wind; and an average total air exchange every 1.25 minutes.

While the foregoing description of the present invention has been set forth in terms of its application to poultry and with particular reference to broiler poultry, it will be appreciated that the scope of the invention is not limited thereto, but can be applied economically and with favorable and advantageous results to other types of animals: for example, larger animals such as pigs, lambs or goats and smaller animals such as birds. By reason of the absolute mobility of the present blower, it can be moved anywhere from a chicken house, for example, to a piggery, as circumstances or economics of the framing industry may dictate having regard to marketing conditions prevailing at the time.

It is also to be understood that while the specifications, dimensions and capacities, performance curves, performance data and equipment of the engine and propeller and frame have been set forth in greater detail above, the same may be modified and materials and specifications may be changed having regard to the availability and marketing of such materials and equipment: without altering or compromising in any way the absolute mobility of the present inventive fan.

The present mobile blower apparatus or assembly is an inexpensive, large-volume, air movement machine which is highly adaptable to a variety of uses, especially those requiring long-distance air displacement in areas with inadequate electric service, for example, chicken houses which are usually wired with 110 volt lines. Its mobility makes it especially valuable in situations where intermittent infrequent needs occur over a wide area, for example, in orange groves to limit crop freeze or emergency situations to disperse toxic fumes.

What is claimed is:

1. A method of rearing poultry in poultry houses which includes the steps of:

a. assembling a gasoline engine driven mobile fan constructed and arranged to be moved bodily from place to place and from time to time;

b. cooling the poultry houses with said mobile fan just before the catch-out process begins;

c. ventilating the said poultry houses with said mobile fan during the catch-out process;

d. cooling the poultry with said mobile fan while holding the poultry for further processing; and e. simultaneously protecting said poultry and the poultry workers against respiratory illnesses by reducing the moisture content of poultry manure in said poultry houses and dispersing the odors therefrom.

2. The method of claim 1 which includes the step of bodily moving the mobile fan from one poultry house to another following the steps of cooling and ventilating the poultry houses, cooling the poultry, and simultaneously protecting said poultry and said poultry workers against respiratory ailments by reducing the moisture content of poultry manure in said poultry houses and dispersing the odors therefrom.

*3. A method of rearing poultry in poultry houses which includes the steps of:*

*a. assembling an internal combusion driven movable fan constructed and arranged to be moved bodily from place to place and from time to time;*

*b. cooling the poultry houses with said mobile fan just before the catch-out process begins;*

*c. ventilating the said poultry houses with said mobile fan during the catch-out process;*

*d. cooling the poultry with said mobile fan while holding the poultry for further processing; and*

*e. simultaneously protecting said poultry and the poultry workers against respiratory illnesses by reducing the moisture content of poultry manure in said poultry houses and dispersing the oders therefrom.*

*4. The method of claim 3 which includes the step of bodily moving the mobile fan from one poultry house to another following the steps of cooling and ventilating the poultry houses, cooling the poultry, and simultaneously protecting said poultry and said poultry workers against respiratory ailments by reducing the moisture content of poultry manure in said poultry houses and dispersing the odors therefrom.*

*5. The method of claims 1 or 3 wherein air movement provided by the mobile fan is in the order of 118,000 CFM with a 4 MPH wind; and an average total air exchange every 1.5 minutes.*

*6. A method of rearing poultry in poultry houses which includes the steps of:*

*a. providing a mobile fan constructed and arranged to be moved bodily from place to place and from time to time and having an output in the order of 118,000 CFM with a 4 MPH wind;*

*b. cooling the poultry houses with said mobile fan just before the catch-out process begins;*

*c. ventilating the said poultry houses with said mobile fan during the catch-out process;*

*d. cooling the poultry with said mobile fan while holding the poultry for further processing; and*

*e. simultaneously protecting said poultry and the poultry workers against respiratory illnesses by reducing the moisture content of poultry manure in said poultry houses and dispersing the oders therefrom.*

*7. A method of rearing poultry in poultry houses having insufficient or no ventilation apparatus which method includes the steps of:*

*a. providing mobile fan means constructed and arranged to be moved bodily from place to place and from time to time;*

*b. cooling the poultry houses with said mobile fan means before the catch-out process begins;*

*c. bodily moving said mobile fan means from one poultry house to another thus providing mobile fan means for that next poultry house and cooling that next poultry house with said mobile fan means.*

*8. The method of rearing poultry in poultry houses having insufficient or no ventilation apparatus which method includes the steps of:*

*a. providing mobile fan means constructed and arranged to be moved bodily from place to place and from time to time;*

*b. ventilating the poultry houses with said mobile fan means during the catch-out process;*

*c. moving said mobile fan means from one poultry house to the next thus providing a mobile fan for that next poultry house and ventilating that next poultry house with said mobile fan means during the catch-out process.*

*9. The method of rearing poultry in poultry houses having insufficient or no ventilation apparatus which method includes the steps of:*

*a. providing mobile fan means constructed and arranged to be moved bodily from place to place and from time to time;*

*b. cooling the poultry with said mobile fan means while holding the poultry for further processing;*

*c. bodily moving said mobile fan means from one poultry house to the next thus providing mobile fan means for that next poultry house and cooling the poultry from*

*that next poultry house with said mobile fan means while holding the poultry for further processing.*

*10. The method of rearing poultry in poultry houses having insufficient or no ventilation apparatus which method includes the steps of:*

*a. providing mobile fan means constructed and arranged to be moved bodily from place to place and from time to time;*

*b. sumultaneously protecting said poultry and the poultry workers against respiratory illnesses by reducing the moisture content of poultry manure in said poultry houses and dispersing odors therefrom with said mobile fan means;*

*c. bodily moving said mobile fan means from one poultry house to the next thereby providing mobile fan means for that next poultry house and simultaneously protecting poultry and the poultry workers against respiratory illnesses by reducing the moisture content of poultry manure and dispersing odors therefrom with said mobile fan means in that next poultry house.*

* * * * *

UNITED STATES PATENT AND TRADEMARK OFFICE

CERTIFICATE OF CORRECTION

PATENT NO. : Re. 33,638

DATED : July 16, 1991

INVENTOR(S) : William E. Lilliston, Sr. et al

It is certified that error appears in the above-identified patent and that said Letters Patent is hereby corrected as shown below:

Column 6, lines 4 and 32, "oders" should be --odors--.

Signed and Sealed this

Fifteenth Day of December, 1992

*Attest:*

DOUGLAS B. COMER

*Attesting Officer*

*Acting Commissioner of Patents and Trademarks*